United States Patent [19]

Gaylor et al.

[11] Patent Number: 4,950,042
[45] Date of Patent: Aug. 21, 1990

[54] INTEGRATED OPTICAL GIVENS ROTATION DEVICE

[75] Inventors: Thomas K. Gaylor; Erik I. Verriest, both of Altanta, Ga.; Mir M. Mirsalehi, Huntsville, Ala.

[73] Assignee: Georgia Tech Research Corporation, Atlanta, Ga.

[21] Appl. No.: 232,905

[22] Filed: Aug. 16, 1988

Related U.S. Application Data

[63] Continuation-in-part of Ser. No. 049,722, May 12, 1987, abandoned.

[51] Int. Cl.[5] .......... G02B 6/12; G02F 1/21

[52] U.S. Cl. .......... 350/96.14; 350/96.11; 350/96.15

[58] Field of Search .......... 350/96.11, 96.12, 96.13, 350/96.14, 96.15

[56] References Cited

U.S. PATENT DOCUMENTS

| | | | |
|---|---|---|---|
| 4,008,947 | 2/1977 | Baües et al. | 350/96.14 |
| 4,125,316 | 11/1978 | Stotts et al. | 350/96.13 |
| 4,384,760 | 5/1983 | Alferness | 350/96.14 |
| 4,403,833 | 9/1983 | Kenan et al. | 350/96.14 X |
| 4,592,004 | 5/1986 | Bocker et al. | 350/96.14 x |
| 4,607,344 | 8/1986 | Athale et al. | 350/96.14 X |
| 4,711,515 | 12/1987 | Alferness | 350/96.14 |

*Primary Examiner*—John D. Lee

*Attorney, Agent, or Firm*—Hurt, Richardson, Garner, Todd & Cadenhead

[57] ABSTRACT

An elementary optical Givens rotation device is disclosed comprising a monolithic integrated optical circuit including crossed waveguides, interdigitated electrode means associated with the crossed waveguides at their crossing point, and electro-optic phase shifter means lying upstream and downstream of the interdigitated electrode means with respect to one of the waveguides. Two mutually coherent, transverse magnetic input light signals are guided simultaneously into each waveguide. A voltage applied to the interdigitated electrode means induces a diffraction grating thereby forming transmitted and diffracted light waves in output sections of the respective waveguides. Phase shifter means include means for applying voltages to each phase shifter which are equal in magnitude but opposite in sign so that the transmitted and diffracted waves combine in phase in one waveguide and combine 180° out of phase in the other waveguide. The device is useful for matrix triangularization by arranging arrays of these devices in a parallel or pipelined architecture on a substrate.

16 Claims, 5 Drawing Sheets

INTEGRATED OPTICAL GIVENS ROTATION DEVICE

STATEMENT OF GOVERNMENT INTEREST

The invention described herein was made with Government support under contract number DAAG29-84-K-0024 on a grant from the Joint Services Electronics Program and under contract number N0014-86-K-0626 from the Strategic Defense Initiative (SDI) Office. The Government has certain rights in this invention.

REFERENCE TO RELATED APPLICATION

This is a continuation-in-part of application Ser. No. 049,722, filed May 12, 1987, now abandoned.

BACKGROUND OF THE INVENTION

There is currently a need for very high speed data processing systems in many fields of endeavor such as ultra-high resolution image processing, control of communication networks, air traffic control, synthetic aperture radar imaging, and simulation problems such as aerodynamic modeling and weather prediction requiring the solution of the Navier-Stokes equation. Real-time calculations for these highly complex and computationally intensive types of problems are largely beyond the capabilities of present day computing systems. Solutions of the problems associated with fields of endeavor such as those listed above can always be expressed in terms of linear algebra matrix-based algorithms and the types of operations needed include matrix-vector multiplication, matrix-matrix multiplication, matrix inversion, solution of linear equations, solution of least-square problems, singular value decomposition, the discrete Fourier transformation, and calculation of eigenvalues and eigenvectors. All of these calculations may be performed by using the Givens rotation operation repeated many times over many elements. For example, a set of linear equations of arbitrary size can be solved using the Givens rotation to triangularize the matrix of coefficients, followed by back substitution to determine the unknowns.

The use of optics in computation offers great potential for large-scale, high-speed computing power. Optics inherently has four powerful attributes; namely, large bandwidth, parallelism, interconnectivity and special functions. Summarizing each of these attributes, first the high carrier frequency ($\simeq 10^{14}$ Hz) offers the potential for high-speed operation. This attribute is primarily responsible for the success of fiber optics. Second, integrated optical (two-dimensional) and bulk optical (three-dimensional) systems are capable of handling and processing many channels of data simultaneously. Third, in optical form, channels of data can physically pass through each other without altering the data. This property distinguishes optical signals significantly from the charge-based signals in metallic conductors which must remain separate from each other. Interconnectivity allows the switching (interchanging or broadcasting) of data channels in any arbitrary pattern. Fourth, numerous analytic functions can be implemented directly with optics. The best known of these is the Fourier transform, which gave rise to the field of "Fourier Optics." Other transformations, e.g., the Hadamard, the Hartley, the Mellin, the Radon, also have direct optical implementations. Similarly, the sine and cosine functions can be implemented in optical form and are central to the type of processing performed by the device of this invention.

A primary disadvantage of optics is low accuracy. This shortcoming makes these systems appropriate for fast, first-pass processors used in applications that do not require high accuracy. The attributes of optics thus differ dramatically from those of electronics. To use efficiently the attributes of both optics and electronics in dealing with large-scale complex processing, there is a need for hybrid optical-electronic processing systems. The hybrid system of this invention requires optical-electronic phase-sensitive detection and electronic feedback.

SUMMARY OF THE INVENTION

It is a primary object in connection with this invention to provide a very fast elementary Givens rotation matrix device in the form of a monolithic integrated optical guided wave circuit in combination with electro-optic phase shifters and a "thick" transmission phase diffraction grating. Due to the nonlinear sine and cosine functions, the Givens rotation operation consumes a significant amount of time and/or semiconductor material when implemented in digital electronics, even though efficient bit-recursive methods using simple shift and add operations known as coordinate rotation digital computing (CORDIC) have been developed. Preferably, the device is a lithium niobate integrated optical coherent implementation of the elementary Givens rotation matrix device.

It is a further object of this invention to provide both parallel and pipelined arrays of Givens rotation devices to perform matrix triangularization.

It is a still further object of this invention to provide a method for calibrating a system comprising one or more optical Givens rotational devices to minimize errors.

Preferably, the device is a lithium niobate integrated optical coherent implementation of the elementary Givens rotation matrix device.

DETAILED DESCRIPTION OF THE INVENTION

Figure 1:
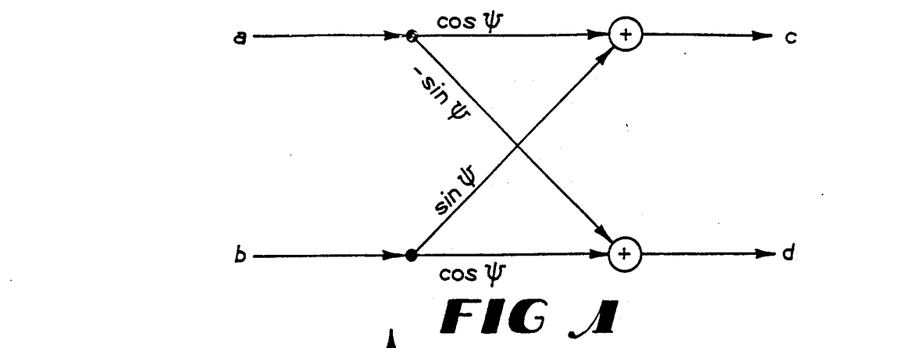
FIG. 1 is a flow graph for the elementary rotation matrix operation.
Figure 2A:
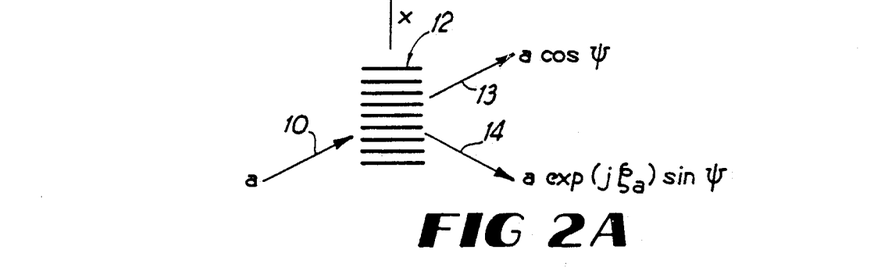
FIG. 2a is a diagrammatic representation of the transmitted and diffracted amplitudes for the "a" wave.
Figure 2B:
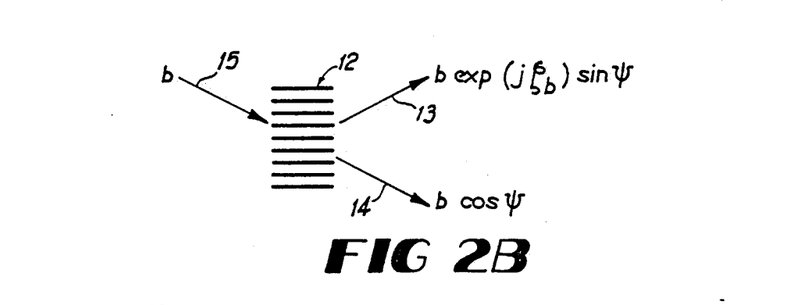
FIG. 2b is a diagrammatic representation of the transmitted and diffracted amplitudes of the "b" wave.
Figure 2C:
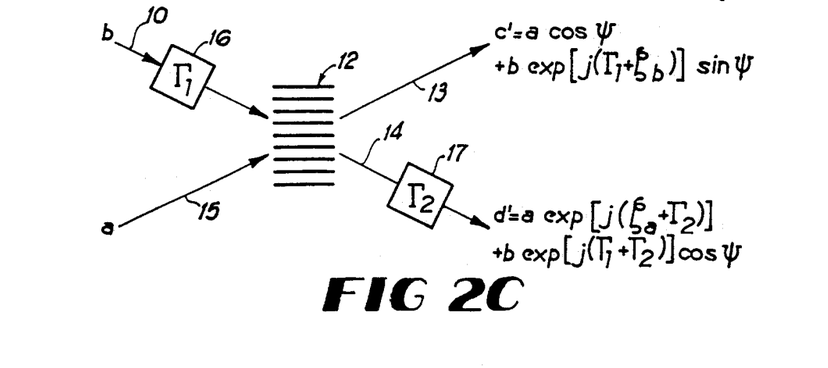
FIG. 2c is a diagrammatic representation of the coherent combination of the "a" and "b" diffractions with external phase shifters.

FIG. 1 is a flow graph which illustrates the elementary rotation matrix operation corresponding to equation (1) listed in the APPENDIX following this detailed description. The operating principles are illustrated in FIGS. 2a, 2b and 2c. In FIG. 2a, coherent light of amplitude "a" is guided by the symbolically indicated waveguide 10 to be incident at the first Bragg angle on the "thick" transmission phase grating 12 where diffraction is induced by voltage applied to periodic metallic electrodes. The transmitted amplitude of the wave as guided by the waveguide portion 13 is as is set forth in equation (2) and the diffracted amplitude of the wave as guided by the waveguide portion 14 is as is set forth in equation (3). These amplitudes are referenced to the x=0 origin at the output side of the grating 12 and the transmitted amplitude at this origin has been arbitrarily taken as positive real The phase factor that appears in the diffracted amplitude in equation (3) represents the phase difference between the transmitted and diffracted waves at the x=0 output point. The sinusoidal grating refractive index is expressed in equations (4), where $n_o$ is the average index, $n_1$ is the amplitude of the index modulation, K is the magnitude of the grating vector, related to the grating period as indicated, and $\Phi_n$ represents the phase of the cosinusoidal grating with respect to the x=0 origin. If, for example, the x=0 origin is chosen so that the phase of the cosinusoidal grating is zero, then the grating has the commonly treated cosinusoidal form noted in equation (4'). For this case, the phase of the cosinusoidal grating is $-\pi/2$ and the diffracted amplitude is the well known result indicated in equation (4"). In general, the phase angle of the diffracted wave is as set forth in equation (5) where $\Phi_n$ is an arbitrary phase of the diffraction grating, e.g. where x origin is not equal to zero at the output of the grating 12.

In FIG. 2b, coherent light of amplitude "b" is guided by the waveguide portion 15 incident on the grating 12 at the other first Bragg angle producing the transmitted amplitude as set forth in equation (6) and the diffracted amplitude as set forth in equation (7). The exponential phase factor that appears in the diffracted amplitude again represents the phase difference between the transmitted and diffracted waves at the x=0 output point of the grating. Since the "b" wave has a component in the −x direction (compared to a component in the +x direction for the "a" wave), the phase angle for the diffracted "b" wave is not the same as is the case for the diffracted "a" wave. For the general case, the phase angle for the "b" wave is as set forth in equation (8).

Coherently combining these two diffraction processes and including two external phase shifters 16 and 17 (whose purpose will presently appear) produces the device as illustrated in FIG. 2c. The output amplitudes c' and d' are given in equations (9) and (10). The waves whose amplitudes are "a" and "b" combine to form an interference pattern at the location of the grating 12. In the absence of any external phase shift and for "a" and "b" representing positive numbers, the waves are in phase and a maximum in the interference pattern is taken to be the x=0 origin at the output of the grating 12. However, in any practical device, the interdigitated-electrode voltage-induced cosinusoidal grating 12 may initially have an arbitrary phase $\Phi_n$ with respect to this interference pattern. The following Table I gives values of the external phase shifts required to achieve elementary rotation matrix operation, for several representative values of $\Phi_n$. See equations (4), (5), (8), (11) and (12).

TABLE I

Diffracted Wave Phase Factors ($\zeta_a$ and $\zeta_b$) and External Phase Shifts ($\Gamma_1$ and $\Gamma_2$) Required to Achieve Elementary Rotation Matrix Operation.

| n(x) | $\Phi_n$ | $\zeta_a$ | $\zeta_b$ | $\Gamma_1$ | $\Gamma_2$ |
|---|---|---|---|---|---|
| $n_0 + n_1 \cos Kx$ | 0 | $-\pi/2$ | $-\pi/2$ | $+\pi/2$ | $-\pi/2$ |
| $n_0 - n_1 \sin Kx$ | $\pi/2$ | 0 | $-\pi$ | $\pi$ | $-\pi$ |
| $n_0 - n_1 \cos Kx$ | $\pi$ | $+\pi/2$ | $+\pi/2$ | $-\pi/2$ | $+\pi/2$ |
| $n_0 + n_1 \sin Kx$ | $-\pi/2$ | $-\pi$ | 0 | 0 | 0 |

It will be seen that if the sum of the phase shift effected by the phase shifter 16 and the phase angle of the diffracted "b" wave is an integer multiple of $2\pi$, if the sum of the phase angle of the diffracted "a" wave and the phase of the phase shifter 17 is an odd integer multiple of $\pi$, and if the sum of the phase shifts effected by the phase shifters 16 and 17 is an integer multiple of $2\pi$, then c'=c and d'=d, the values corresponding to those given by the elementary rotation matrix operation, equation (1). If the phase of the cosinusoidal grating with respect to the x=0 origin is not equal to $-\pi/2$, equations (11) and (12) determine the settings of the external phase shifters required to accomplish the desired elementary rotation matrix operation.

As can be seen from Table I, if the grating 12 is a positive sine grating (that is, $\Phi_n = -\pi/2$), then external phase shifters 16 and 17 are not required. This occurs if a bright fringe in the interference pattern occurs at a position in the grating 12 where $n(x)=n_o$ and the index is increasing in the positive x direction. Ideally, the interdigitated electrodes of the grating 12 should be fabricated with this relationship to the interference pattern. However, this ideal is not practically reproducible and the phase shifters 16 and 17 are important to allow the correct phase relationship to be adjusted to produce the elementary rotation operation.

Figure 3:
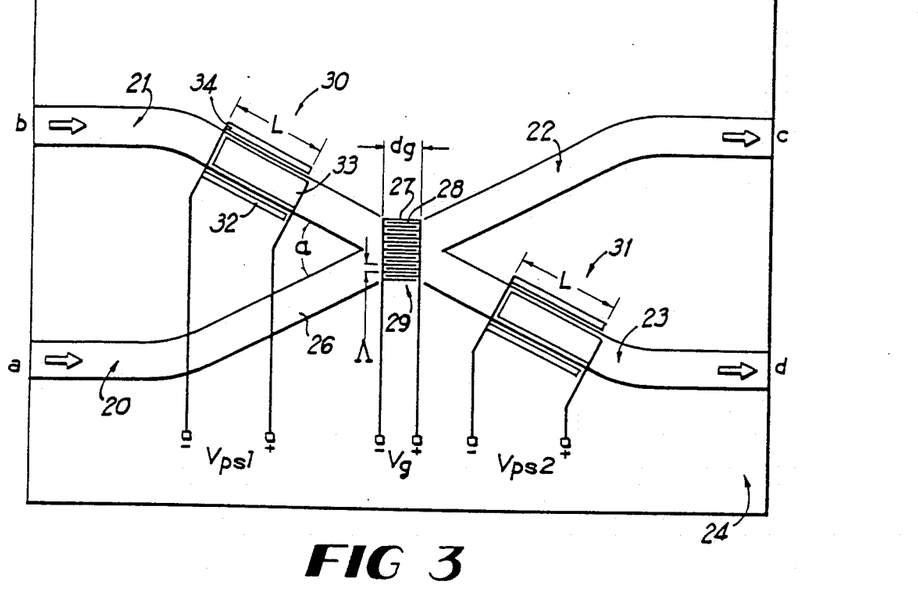
FIG. 3 is a schematic of an integrated optical elementary rotation matrix device according to this invention.

FIG. 3 is a plan view of an integrated optical implementation of the invention. The input light signals of amplitudes "a" and "b" are guided in TM modes in the crossed channel waveguides having the input portions 20 and 21 and the output portions 22 and 23. The waves of amplitudes "c" and "d" are guided in the portions 22 and 23 of the two, crossed waveguides. The optical paths are conventional single-lateral-mode channel waveguides formed in the z-cut lithium niobate substrate 24 by titanium in-diffusion. The input signals are two mutually coherent, monochromatic TM guided waves preferably derived from the same laser source (not shown). The amplitudes of these waves represent the values "a" and "b" which individually may be positive or negative and may be expressed as set forth in equations (13) and (14) where $\Phi_a$ and $\Phi_b$ are either 0 (for a positive number) or $\pi$ (for a negative number). If "a" and "b" are of the same sign, the waves are in phase and if of opposite signs, the waves are 180 degrees out of phase.

The use of TM guided modes (polarization perpendicular to the surface of the device) as opposed to TE guided modes, allows a lower diffraction grating modulation voltage $V_g$ to be used and avoids possible polarization rotation effects due to the bulk photovoltaic effect in lithium niobate because the polarization is already parallel to the optic axis. The straight sections 25 and 26 of the input waveguides cross at the angle $\alpha$ and underlie the interdigitated electrodes 27 and 28 of the diffraction grating 29, of the "thickness" $d_g$ and the periodicity indicated, to satisfy the first Bragg angle conditions as noted above. Equation (15) specifies the grating period in terms of the free space wavelength (numerator) divided by twice the extraordinary refractive index times the sine of the angle of incidence. For a freespace wavelength of 1.0 micron, the extraordinary refractive index of 2.158 and an angle of incidence of 10 degrees, the grating period would be about 1.33 microns. The Bragg regime parameter may be defined in accord with equation (16) and, if sufficiently large, the transmitted and diffracted amplitudes are proportional to sine and cosine as given by equations (2), (3), (6) and (7). In grating diffraction, the grating strength parameter is as defined in equation (17) for guided TM modes. The electric field component in the z direction (optic axis direction) is $E_z$, produced by the interdigitated electrodes and induces a refractive index grating whose amplitude is approximately defined by equation (18) where $r_{33}$ is the element of the electro-optic tensor for z-polarized light and an applied electric field in the z direction. The magnitude of the applied electric field produced by the application of the grating voltage $V_g$ is approximately $2V_g/\Lambda$. Thus, the transmitted and diffracted amplitudes produced by a positive cosinusoidal grating may be expressed according to equations (19) and (20). The amplitudes contain the desired cosine and sine multiplications.

The electro-optic phase shifters 30 and 31 adjust the relevant phases to produce the desired real addition at the "c" output and the real subtraction at the "d" output. These devices also utilize $E_z$ to change the extraordinary refractive index and thus the optical path lengths. Equation (21) gives the value of the applied electric field required for a phase shift $\Gamma_i$ where L is the length of the electrodes 32, 33 and 34. Since the two phase shifters are identical but with phase shifts of opposite signs, the phase shifter voltages $V_{ps1}$ and $V_{ps2}$ will be equal in magnitude and opposite in sign.

Figure 5A:
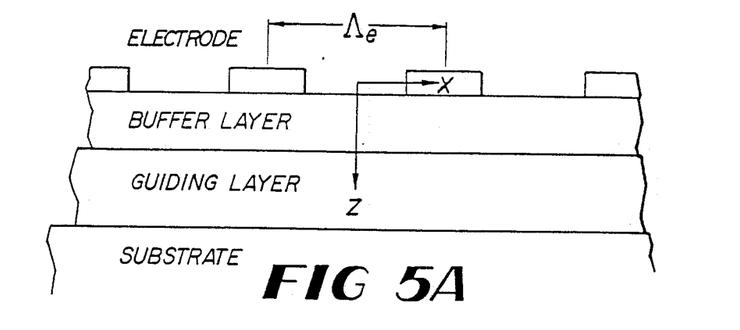
FIGS. 5A and 5B are cross-sectional views of the physical structure of the diffraction grating produced by the interdigitated electrodes.
Figure 5B:
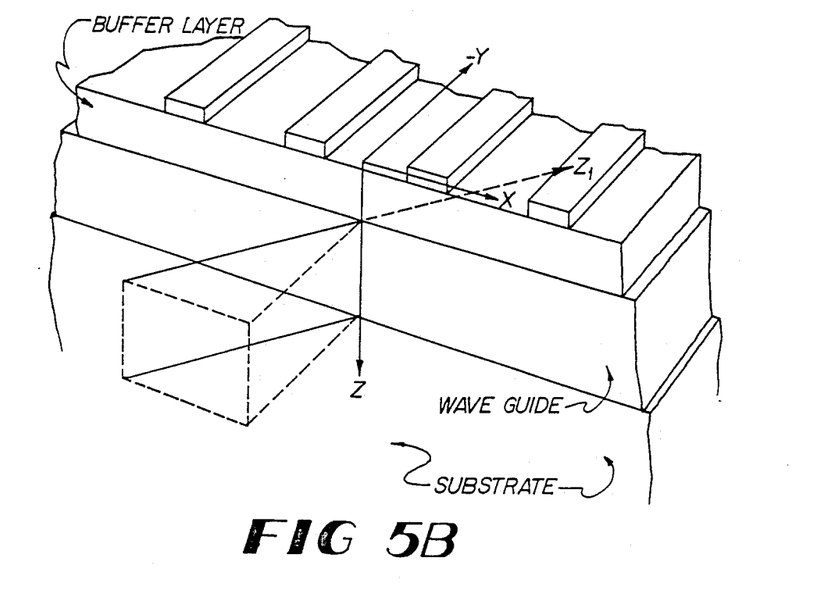

The Givens rotation device described above is composed entirely of electro-optic waveguide devices. It may be constructed by fabricating the channel waveguides, growing a buffer layer over the surface, and depositing the metal electrodes of the diffraction grating and the phase shifters. Referring to FIG. 5a, representative dimensions for the diffraction grating structure are a 1 micron depth for the guiding layer, a 0.2 micron depth for the buffer layer, a 0.1 micron height by 0.335 micron width for the electrodes, and a spacing between electrodes of opposite polarity, $\Gamma_e$, of 0.67 microns.

Referring to the plan view of the implementation in FIG. 3, representative dimensions of the thickness, $d_g$ of the diffraction grating 29 is 1 mm, the length, L, of the phase shifter electrodes 30 and 31 is 1 mm, the width of the channel electrode 33 is 6 microns, the width of the electrodes 32 and 34 outside the channel is 2 microns, the width of the waveguide channels 20, 21, 22, 23, and 26 is 8 microns, the spacing between electrodes of the same polarity, $\Gamma$, is 1.33 microns, and the angle, $\alpha$, which is twice the angle of incidence is 20 degrees. Overall, a typical length of the integrated optical circuit device is 5–10 mm, and a typical width is 3–5 mm. Typical voltage ranges for $V_g$, $V_{ps1}$, and $V_{ps2}$ are $\pm 10$ volts. The physical dimensions provided are representative only, and are not a limitation on the device.

After fabrication, the phase shifter voltages $V_{ps1}$ and $V_{ps2}$ are adjusted to give the desired performance. These voltages then remain fixed. The grating voltage $V_g$ is initially varied until $d = 0$ is obtained. This voltage remains constant while new matrix optical inputs of amplitudes "a" and "b" are applied and the corresponding matrix element optical output amplitudes "c" and "d" are obtained.

Figure 4A:
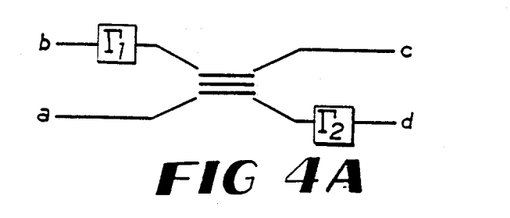
FIG. 4a is a diagrammatic representation of a codirectional form of a rotation matrix device as needed in lattice filtering.
Figure 4B:
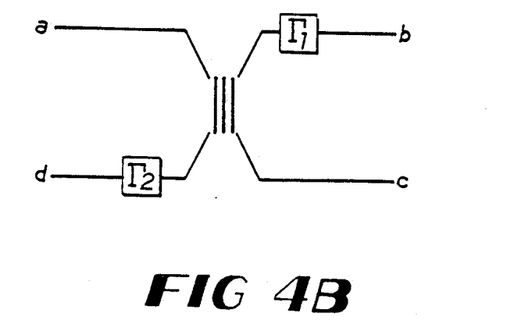
FIG. 4b is a diagrammatic representation of a contradirectional form of a rotation matrix device.

The Givens rotation device of this invention could be used as a fundamental building block in lattice filters, wavefront processors, and a variety of other processing structures. In these devices, the grating voltage would remain fixed and would not have to be varied. The device as in FIG. 3 has codirectional data flow as is needed in ladder implementation of modeling filters. See also FIG. 4a. With the minor reconfiguration as indicated in FIG. 4b, the device may be used with contradirectional data flow.

Although lithium niobate is the preferred material of construction, rotation matrix devices according to this invention may be constructed in integrated optical form using electro-optic semiconductor material such as gallium arsenide. Bulk optical implementations, although not as fast, are also possible.

Greatly increased processing throughput can be obtained by having parallel arrays of these devices with the same grating voltage $V_g$ applied to all of them. This would allow simultaneous parallel computation of all revised matrix elements associated with the zero element produced.

In principle, a single device could be used many times to accomplish matrix triangularization. However, a more Practical application is to integrate many Givens rotation devices on a single dielectric substrate in a manner analogous to integrating transistors on a single semiconductor substrate. Matrix triangularization can be accomplished by either a parallel architecture or a pipelined architecture.

Figure 6:
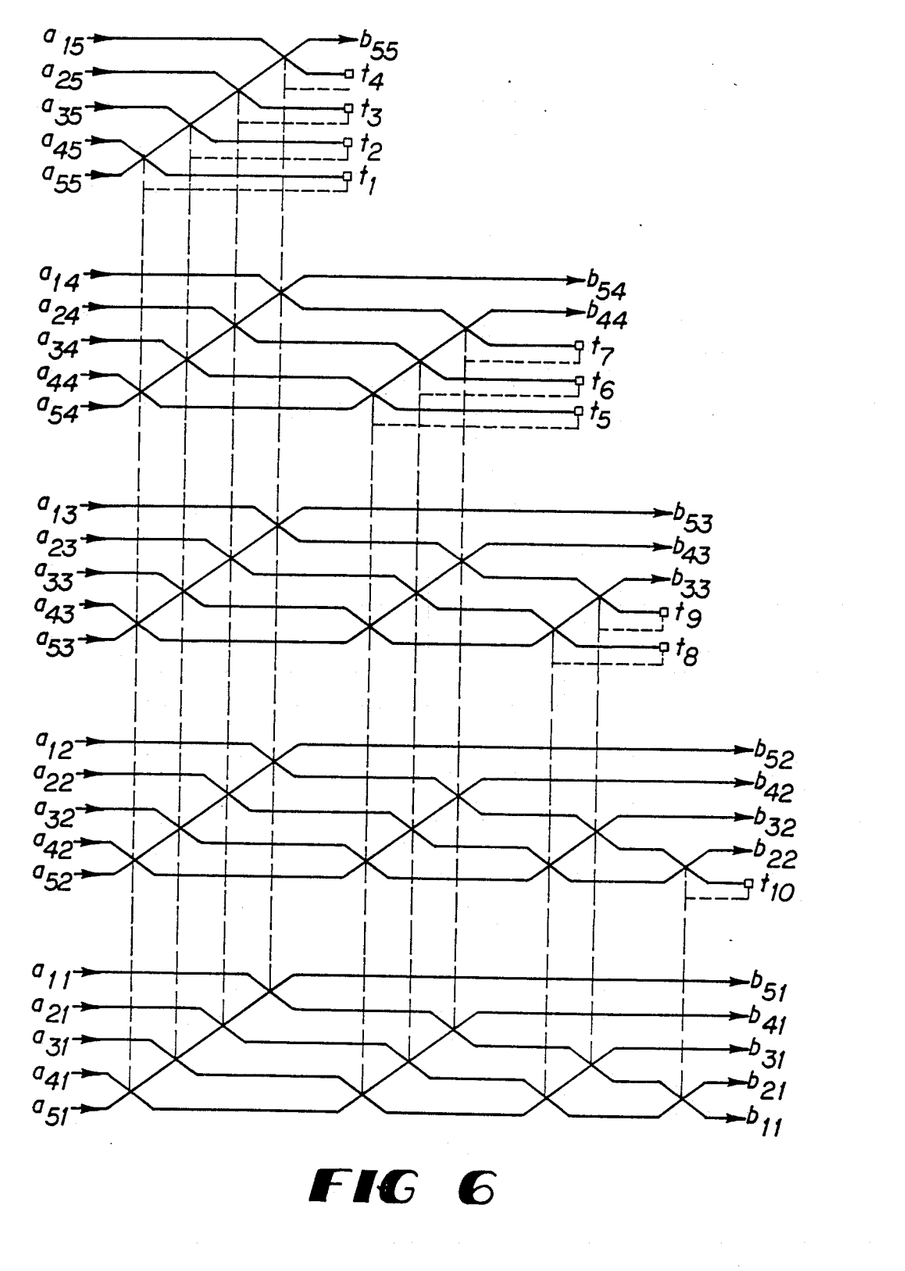
FIG. 6 is a diagramatic representation of a parallel architecture comprising an array of elementary rotation matrix devices for matrix triangularization.

FIG. 6 illustrates a parallel architecture implementation to triangularize an $N \times N$ matrix, wherein $N = 5$. In this configuration, all $N^2$ matrix elements are entered into the system simultaneously. The solid lines in FIG. 6 represent channel waveguides. At each intersection of channel waveguides is a rotation device. Each dashed line represents a pair of metal conductors. All Givens rotational devices in a vertical column are connected together in parallel. The optical amplitudes corresponding the elements of the Nth column of the matrix enter the N channel waveguides at the top of the diagram. Detectors are represented by squares at the right. A detector at the end of each channel waveguide corresponds to matrix elements to be zeroed in the triangularization process.

The time steps associated with the triangularization process are labeled $t_i$ (in this case, $t_1$ to $t_{10}$). In the first time interval, $t_1$, the value of $a_{45}$ is initially detected (by the detector labeled $t_1$). The voltage applied to the leftmost column of rotators is swept until the amplitude detected is zero. This step zeroes the $a_{45}$ element and changes the $a_{55}$ element according to equation 1. Simultaneously, the elements $a_{4j}$ and $a_{5j}$ (j=1 to 4) are changed by the same rotation. The voltage on this column of rotators remains at this value for the remainder of the triangularization process. In the second time interval, $t_2$, the value of $a_{35}$ is detected (by the detector labeled $t_2$). The voltage applied to the second column of rotators is swept until the detected amplitude of $a_{35}$ is zero. The $a_{55}$ element is correspondingly changed. At the same time, the elements $a_{3j}$ and $a_{5j}$ (j=1 to 4) are similarly transformed. After the time interval $t_4$, the fifth column has been entirely zeroed except for one element. This element has been transformed four times and is now $b_{55}$, an element of the final triangularized matrix. All elements of the other columns experience the same transformations that zeroed the fifth column since the rotators in a vertical column are connected in parallel. In the fifth time interval, $t_5$, the new value of $a_{34}$ is detected. The voltage applied to the fifth column of rotators is set so as to zero this amplitude. This step correspondingly changes the value of the $a_{44}$ element and the other elements in this column of rotators. These operations continue through all time intervals. The output amplitudes shown in FIG. 6 ($b_{11}$ through $b_{55}$) are the element values of the triangularized matrix. The total number of time steps and number of detectors is $(N^2-N)/2$. The total number of rotators required is $(N^3-N)/3$.

The $a_{ij}$ input elements and the $b_{ij}$ output elements may be positive or negative real numbers. The detected optical wave associated with a negative number is shifted in phase by 180° relative to the phase of a positive number. Therefore, the values of the triangularized matrix must be detected using phase-sensitive techniques such as heterodyne or homodyne detection. Thus, the output amplitudes are detected in both magnitude and phase.

Figure 7:
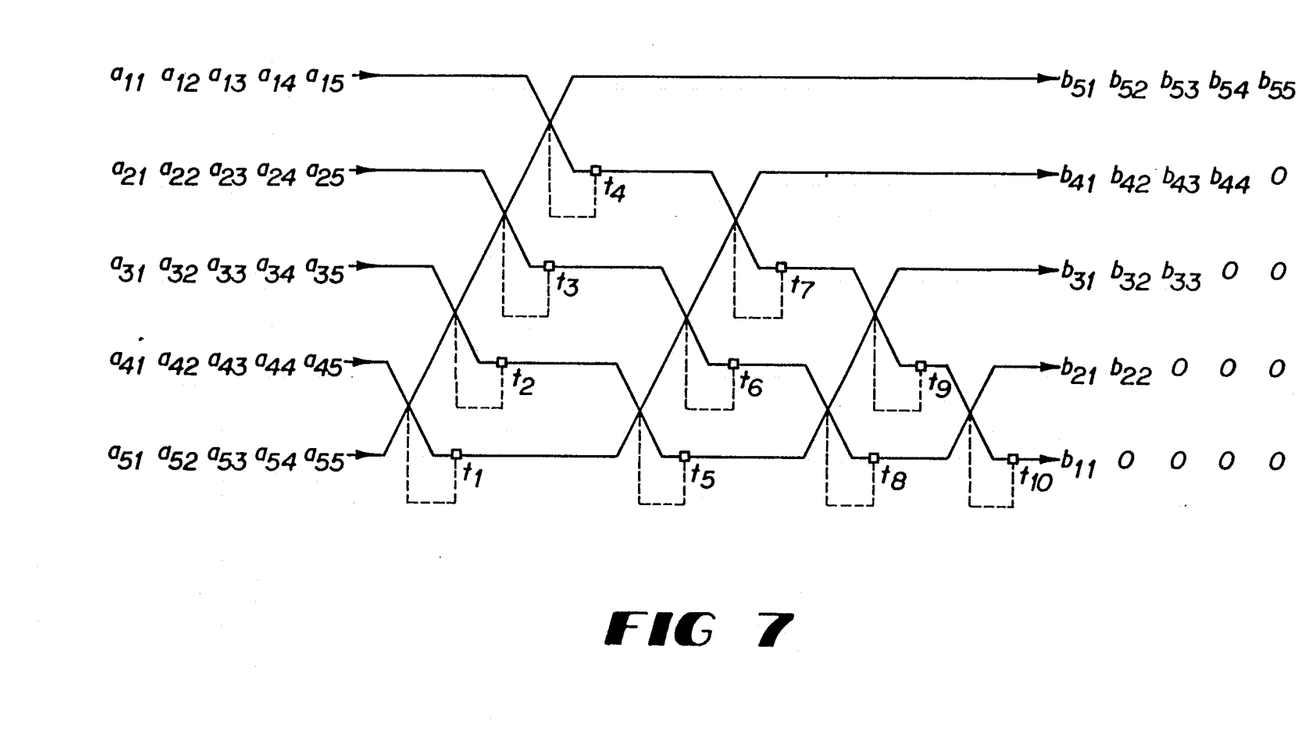
FIG. 7 is diagramatic representation of a pipelined architecture comprising an array of elementary rotation matrix devices for matrix triangularization.

A pipelined architecture implementation for matrix triangularization using integrated optical Givens rotation devices is shown in FIG. 7. Again, this architecture implements a triangular matrix of N=5. In this configuration, one column of N matrix elements is entered in parallel into the system. The optical amplitudes corresponding to the elements of the Nth column of the matrix enter first. This pipelined architecture includes a detector for each rotation device.

In the first time interval, $t_1$, the value of $a_{45}$ is detected (by the detector labeled $t_1$) and the voltage applied to the first rotator is swept until the amplitude detected is zero. This step transforms the $a_{55}$ element according to equation 1. The voltage on this rotator remains at this value for the remainder of the triangularization process. Later, when the N−1 column arrives, the elements $a_{44}$ and $a_{54}$ are transformed by the same rotation. In the second time interval, $t_2$, the value of $a_{35}$ is detected (by the detector labeled $t_2$). The voltage applied to this rotator is swept until the detected amplitude is zero. This step changes the $a_{55}$ element correspondingly. After the time interval $t_4$, the fifth column has been entirely zeroed except for the $b_{55}$ element of the final triangularized matrix. One after another, the elements of the other columns experience the same transformations that zeroed the fifth column. It experiences no further changes as shown by the straight section of waveguide in FIG. 7. In the fifth time interval, $t_5$, the new value of $a_{34}$ is detected. The voltage applied to this rotator is set so as to zero this amplitude. The value of $a_{44}$ is correspondingly transformed. This mode of operation continues. Finally, the first column enters and experiences all of the previously set rotations. The output amplitudes shown ($b_{11}$ through $b_{55}$) are the element values of the triangularized matrix.

The total number of time steps is $(N^2-N-2)/2$. The number of detectors is again $(N^2-N)/2$. The total number of rotators required is $(N^2-N)/2$, making the pipelined architecture a more practical configuration than the parallel architecture. However, the stricter timing and the required delays create more complexity for signal flow control.

In practice, a variety of errors are possible during device operation. First, errors may be induced by inaccuracies in the construction of the device. Second, errors may be induced by inaccurate control settings (the voltages applied to the interdigitated electrodes and to the phase shifters). Third, at the detection stage, inaccuracies may occur due to the shot noise in the optical signal and thermal noise in the electronic amplifiers following the detectors. The first two types of errors can be minimized by proper calibration before operation. In fact, the values of the needed rotation angles are "hidden variables", i.e., their values are not explicitly required if the devices are used in an adaptive mode such as that of the parallel and pipelined architectures previously described.

An analysis of the device physics reveals several possible deviations from the desired rotation transformation matrix given in equation (1). The bends in the waveguides may produce small losses. Any deviation from the design value in the angle between the crossing waveguides may induce crosstalk between the channels. Such losses result in an additional rotation, small losses and phase shifts in the beams. Inaccuracies in the device parameters and small drifts in the operating frequencies induce further deviations in the grating strength parameter as given by equation (17). These produce a further additive component in the rotation angle. As a result, the actual transformation matrix before calibration is not given by equation (1), but in phasor notation by equation (22). In this equation, $\Gamma_o$ is the overall phase shift of the output with respect to the local oscillator in the detection process, $\sigma$'s are attenuation coefficients, $\Gamma_1$ and $\Gamma_2$ are each a tunable phase shift plus a phase shift due to inaccuracies, $\zeta_a$ and $\zeta_b$ are phase shifts inherent in the diffraction process, and $\psi$ is the grating strength parameter. The attenuations are typically very small so the attenuation coefficients can be given as $\sigma_i = 1 - Y_i^2$ with $Y_i < < 1$. The grating strength parameter is $\psi = KV_g$, where $V_g$ is the voltage applied to the interdigitated electrodes and K is an effective gain. The controllable parameters are $V_g$ and $\Gamma_i$. The calibration procedure can eliminate most of the errors by suitable choice of $V_g$ and $\Gamma_i$. However, small inaccuracies may still exist. These persistent errors occur because the calibration procedure involves detection of the output.

The coherent detection in the present invention is like that commonly used in coherent fiber-optic communication systems. A received signal amplitude is coherently added with a stronger signal from a local oscillator (a reference beam). The combined optical signal impinges on a photodiode. In homodyne detection, the signal and the reference beam have the same wavelength. Two photodiodes are used to establish a balanced detection scheme. One receives the sum signal and the other the difference signal. To obtain the sum and difference signals, the beams (typically with a 90° angle between them) intersect at a beamsplitter (each beam having a 45° angle of incidence). For amplitudes of the transmitted reference and signal beams measuring $A_R$ and $A_S$, respectively, and a relative phase shift between the beams of $\Gamma_o$, the difference of the photodetector currents $\Delta_i$ is given by equation (23) where $\eta$ is the photodetector quantum efficiency, q is the electronic charge, $\lambda$ is the wavelength, h is Planck's constant, and c is the speed of light.

Inaccuracies may occur after the detection stage due to the quantization of the optical field. These inaccuracies are equivalent to the presence of noise usually called "shot noise," which is a manifestation of the discrete nature of photons. Noise also occurs as thermal noise in the electronic amplifiers. Cooling the amplifiers minimizes the latter. Integration of the signal in time also decreases these uncertainties, but at the expense of slower system operation. The shot noise increases with local oscillator power level, so that if the reference amplitude is made sufficiently large, the thermal component becomes negligible. The shot-noise-limited signal-to-noise ratio (achievable for instance, with a low capacitance p-i-n diode followed by a microwave field-effect transistor amplifier) is given by equation (24) where B is the bandwidth of the detector. The overall effect is that a signal amplitude A (in phase with the reference beam) is detected as $A+\sigma\epsilon$, where $\epsilon$ can be modeled as a standard, normally distributed error with variance $\sigma^2=2[BkT+(\eta\lambda/Bhc)]/\tau$, where T is the absolute temperature, k is Boltzmann's constant, and $\tau$ is the integration time of the detector amplifier.

Calibration before operation eliminates most of these errors. The procedure uses relatively long integration times and slowly ramped voltages to eliminate noise effects. The calibration procedure has three steps. For the first two steps, the "b" input amplitude (see equation (22)) is set to unity and the "a" amplitude to zero. In this case, the detectable output signals "ĉ" and "d̂" are given by equation (25). First, the grating voltage $V_g$ is applied so that "ĉ" is 0. The phase shift $\Gamma_o$ is adjusted so that the detected signal "d̂" is maximum. The product $\sigma_2\sigma_4$ is measured. Second, using the same configuration, $V_g$ is tuned so that "d̂" is 0, and $\Gamma_2$ is adjusted to minimize "ĉ". The product $\sigma_1\sigma_4$ is measured. Third, keeping a fixed voltage applied to the grating, the first input beam is set to unity and the second input beam is set to zero. Now the detectable signals are given by equation (26). The phase shift $\Gamma_1$ is adjusted to maximize the detected signal "d̂". The system is now calibrated. A small error remains due to the residual, individually unadjustable attenuation factors $\sigma_i$. Therefore, with system calibration, the rotation transformation matrix is given by expression (27). Tuning the gains in the detection amplifiers compensates for the effects of some of the products of $\sigma_i$. For one device, this procedure gives only two degrees of freedom. However, with proper fabrication, these attenuations can be very small.

APPENDIX OF EQUATIONS $$\begin{bmatrix} c \\ d \end{bmatrix} = \begin{bmatrix} \cos\psi & \sin\psi \\ -\sin\psi & \cos\psi \end{bmatrix} \begin{bmatrix} a \\ b \end{bmatrix} \quad (1)$$

$$S_{oa} = a\cos\psi \quad (2)$$

$$S_{1a} = a\exp(j\zeta_a)\sin\psi \quad (3)$$

$$n(x) = n_o + n_1\cos(Kx+\phi_n); \quad K = 2\pi/\Lambda \quad (4)$$

$$n(x) = n_o + n_1\cos(Kx) \quad (4')$$

$$S_1 = -j\sin\psi \quad (4'')$$

$$\zeta_a = \phi_n - \pi/2 \quad (5)$$

$$S_{ob} = b\cos\psi \quad (6)$$

$$S_{1b} = b\exp(j\zeta_b)\sin\psi \quad (7)$$

$$\zeta_b = -\phi_n - \pi/2 \quad (8)$$

$$c' = \cos\psi + b\exp\{j(\Gamma_1+\zeta_b)\}\sin\psi \quad (9)$$

$$d' = a\exp\{j(\zeta_a+\Gamma_2)\}\sin\psi + b\exp\{j(\Gamma_1+\Gamma_2)\}\cos\psi \quad (10)$$

$$\Gamma_1 = \phi_n + \pi/2 \quad (11)$$

$$\Gamma_2 = -\phi_n - \pi/2 \quad (12)$$

$$a = |a|\exp(j\phi_a) \quad (13)$$

$$b = |b|\exp(j\phi_b) \quad (14)$$

$$\Lambda = \lambda/2n_E\sin\theta \quad (15)$$

$$p = \lambda^2/\Lambda^2 n_E n_1 \quad (16)$$

$$\psi = \pi n_1 d_g/\lambda\cos\phi \quad (17)$$

$$n_1 = n_E^3 r_{33} E_z/2 \quad (18)$$

$$S_o = a\cos(\lambda d_g n_E^3 r_{33} V_g/\lambda\Lambda\cos\phi) \quad (19)$$

$$S_1 = -j\,a\sin(\pi d_g n_E^3 r_{33} V_g/\lambda\Lambda\cos\phi) \quad (20)$$

$$E_z = \lambda\Gamma_i/\lambda n_E^3 r_{33} L \quad (21)$$

$$\begin{bmatrix} c \\ d \end{bmatrix} = \exp(j\Gamma_0)\begin{bmatrix} \sigma_i\exp(j\Gamma_2) & 0 \\ 0 & \sigma_2 \end{bmatrix} \begin{bmatrix} \cos\psi & \exp(j\zeta_a)\sin\psi \\ \exp(j\zeta_b)\sin\psi & \cos\psi \end{bmatrix} \cdot \begin{bmatrix} \sigma_3\exp(j\Gamma_1) & 0 \\ 0 & \sigma_4 \end{bmatrix} \begin{bmatrix} a \\ b \end{bmatrix} \quad (22)$$

$$\Delta i = (2\eta q\lambda/hc)A_r A_s\cos\Gamma_o \; tm \quad (23)$$

$$SNR = (2\eta\lambda/Bhc)A_s^2\cos^2\Gamma_o \quad (24)$$

$$\hat{c} = \sigma_1\sigma_4\cos(\Gamma_o+\Gamma_2+\zeta_a)\sin\phi$$

$$\hat{d} = \sigma_2\sigma_4\cos\Gamma_o\cos\phi \quad (25)$$

$$\hat{c} = 0 \quad (26)$$

$$\hat{d} = \sigma_2\sigma_3(\Gamma_1+\zeta_b) \quad (16)$$

$$\begin{bmatrix} \sigma_1 & 0 \\ 0 & \sigma_2 \end{bmatrix}\begin{bmatrix} \cos\psi & -\sin\psi \\ \sin\psi & \cos\psi \end{bmatrix}\begin{bmatrix} \sigma_3 & 0 \\ 0 & \sigma_4 \end{bmatrix} \quad (27)$$

We claim:

1. An elementary Givens rotation matrix device comprising a monolithic integrated optical circuit including crossed waveguides, interdigitated-electrode voltage-induced cosinusoidal grating associated with the crossed waveguides at their crossing point such that light from a first of the crossed waveguides is incident at a first Bragg angle and light from a second of the crossed waveguides is incident at another first Bragg angle, the interdigitated-electrode voltage-induced cosinusoidal grating transmitting and diffracting coherent light energy traveling simultaneously through the respective waveguides, a means for applying a constant voltage to the interdigitated-electrode voltage-induced cosinusoidal grating, and electro-optic phase shifter means lying upstream and downstream of the interdigitated-electrode voltage-induced cosinusoidal grating with respect to one of the waveguides for effecting the respective phase shifts therein by applying voltages to said phase shifter means which are equal but of opposite sign.

2. The rotation matrix as defined in claim 1 wherein the interdigitated-electrode voltage-induced cosinusoidal grating is designed and fabricated according to the Bragg regime.

3. The matrix device as defined in claim 1 wherein the phase shifter means comprises two phase shifters, each overlying a portion of the one waveguide and including electrode means of a fixed length, and means for applying equal voltages to each phase shifter having opposite signs.

4. The matrix device as defined in claim 3 wherein the integrated optical circuit comprises a substrate of lithium niobate having the waveguides formed by in-diffused titanium.

5. The matrix device as defined in claim 4 wherein the substrate is covered with a buffer layer and the interdigitated-electrode voltage-induced consinusoidal grating and the phase shifter electrode means are formed on such buffer layer.

6. A method for performing the elementary Givens rotation operation with a monolithic integrated optical circuit including crossed waveguides each having an input section and an output section, interdigitated electrode means associated with the crossed waveguides at their crossing point and oriented so that the first Bragg condition is satisfied, and electro-optic phase shifter means lying upstream and downstream of the interdigitated electrode means with respect to one of the waveguides, comprising the steps of:

guiding two mutually coherent, monochromatic transverse magnetic input light signals simultaneously through the input section in each of said crossed waveguides to said interdigitated electrode means;

inducing a diffraction grating at the interdigitated electrode means by applying a voltage to said electrode means with said diffraction grating then operating on each input light signal to form a transmitted and diffracted wave in the output section in each of said crossed waveguides;

coherently combining the transmitted and diffracted waves formed in each output section of said crossed waveguides by applying voltages that are equal in magnitude but opposite in sign to said upstream and downstream phase shifter means and adjusting said voltages so that the transmitted and diffracted waves formed in the output section of one waveguide are combined in phase and the transmitted and diffracted waves formed in the output section of the other waveguide are combined 180° out of phase; and varying the voltage applied to said interdigitated electrode means until the amplitude of the coherently combined transmitted and diffracted waves formed in the output section of one waveguide is zero.

7. An array of elementary Givens rotation matrix devices arranged in a parallel architecture on a monolithic integrated optical circuit for performing triangularization of a nonsingular square matrix of rank N comprising:

a plurality of crossed channel waveguides configured so that the optical amplitude corresponding to each input element in the matrix to be triangularized are entered simultaneously in each of said crossed waveguides, with each of said waveguides intersecting at least one other of said waveguides that are used to input elements in the same column vector of said matrix;

a plurality of interdigitated electrode means associated with each pair of the crossed waveguides at their crossing point for transmitting and diffracting coherent light energy traveling simultaneously through the respective waveguides;

electro-optic phase shifter means lying upstream and downstream of each of said interdigitated electrode means with respect to one of each pair of said associated crossed waveguides for effecting respective phase shifts therein by applying voltages to said phase shifter means which are equal but of opposite sign;

a plurality of conductor means for electrically connecting in parallel a column of said interdigitated electrode means corresponding to crossed waveguides representing elements in the said pair of rows of said matrix;

a plurality of detector means disposed at the end of each channel waveguide representing a matrix element to be nulled for detecting the output optical amplitude of said channel waveguide; and a plurality of voltage means for successively sweeping the voltage applied to each column of said electrically connected interdigitated electrode means until the corresponding detected output optical amplitude is nulled.

8. The array of matrix devices as defined in claim 7 wherein the number of detectors required is given by the expression $(N^2-N)/2$ and the number of interdigitated electrode means required is given by the expression $(N^3-N)/3$ where N is the number of rows and the number of columns in said matrix.

9. The array of matrix devices as defined in claim 7 wherein the number of voltage means required is given by the expression $(N^2-N)/2$.

10. The array of matrix devices as defined in claim 7 wherein the number of crossed channel waveguides is given by the expression $N^2$.

11. An array of elementary Givens rotation matrix devices arranged in a pipeline architecture for performing triangularization of a nonsingular square matrix of rank N comprising:

a plurality of crossed channel waveguides configured to enter successively the optical amplitudes corresponding to each column of the matrix with each input element in a single column of said matrix entered simultaneously in one of said crossed waveguides, with each of said waveguides intersecting each of said other waveguides;

a plurality of interdigitated electrode means associated with each pair of the crossed transmitting and diffracting coherent light energy travelling simultaneously through the respective waveguides;

electro-optic phase shifter means lying upstream and downstream of each of said interdigitated electrode means with respect to one of each pair of said associated crossed waveguides for effecting respective phase shifts therein by applying voltages to said phase shifter means which are equal but of opposite sign;

a plurality of detector means disposed downstream of each of said interdigitated electrode means with respect to one of each pair of said associated crossed waveguides for detecting the output amplitude of the matrix element to be nulled; and a plurality of voltage means for applying a voltage to each of said interdigitated electrode means until the corresponding detected output optical amplitude is nulled.

12. The array of matrix devices as defined in claim 11 wherein the number of detectors required is given by the expression $(N^2-N)/2$ and the number of interdigitated electrode means required is given by the expression $(N^2-N)/2$ where N is number of rows and the number of columns in said matrix.

13. The array of matrix devices as defined in claim 11 wherein the number of voltage means required is given by the expression $(N^2-N)/2$.

14. The array of matrix devices as defined in claim 11 wherein the number of crossed channel waveguides is given by the expression N.

15. A method for performing matrix triangularization with a monolithic integrated optical circuit having components arranged in a parallel architecture including a plurality of crossed channel waveguides with each waveguide having an input section and an output section, a plurality of interdigitated electrode means associated with the crossed waveguides at their crossing point and oriented so that the first Bragg condition is satisfied, electo-optic phase shifter means lying upstream and downstream of each of said interdigitated electrode means with respect to one of each pair of said associated crossed waveguides, a plurality of conductor means for electrically connecting in parallel each column of interdigitated electrode means corresponding to crossed waveguides representing elements in the same pair of rows of said matrix, a plurality of detector means disposed at the end of each channel waveguide whose optical amplitude is to be nulled, and a plurality of voltage means, said method comprising:

guiding mutually coherent, monochromatic transverse magnetic input light signals simultaneously through the input section in each of said pair of crossed waveguides to said associated interdigitated electrode means;

inducing a diffraction grating at said interdigitated electrode means by applying a voltage to said electrode means with said diffraction grating then operating on each light signal to form a transmitted and a diffracted wave in the output section in each of said pair of crossed waveguides;

coherently combining the transmitted and diffracted waves formed in the output section of each of said pair of crossed waveguides by applying voltages that are equal in magnitude but opposite in sign to said upstream and downstream phase shifter means associated with said crossed waveguides and adjusting said voltages so that the transmitted and diffracted waves formed in the output section of one wave guide are combined in phase and the transmitted and diffracted waves formed in the output section of the other waveguide are combined 180° out of phase;

sweeping the voltage applied to said electrically connected column of interdigitated electrode means until the amplitude of the coherently combined and transmitted and diffracted waves formed in the output section of one waveguide is zero; and repeating the steps of inducing a diffraction grating, coherently combining the transmitted and diffracted waves, and sweeping the voltage applied to said electrically connected column of interdigitated electrode means successively to each of said columns of electrically connected interdigitated electrode means.

16. A method for performing matrix triangularization with a monolithic integrated optical circuit having components arranged in a pipeline architecture including a plurality of crossed waveguides with each of said waveguides having an input section and an output section and with each of said waveguides intersecting each of said other waveguides, a plurality of interdigitated electrode means associated with the crossed waveguides at their crossing point and oriented so that the first Bragg condition is satisfied, electro-optic phase shifter means lying upstream and downstream of each of said interdigitated electrode means with respect to one of each pair of crossed waveguides, a plurality of detector means disposed downstream of each of said interdigitated electrode means with respect to one of each pair of said associated crossed waveguides, and a plurality of voltage means, said method comprising:

guiding mutually coherent, monochromatic transverse magnetic input light signals corresponding to one column of said matrix simultaneously through the input section in each of said pair of crossed waveguides to said associated interdigitated electrode means;

inducing a diffraction grating at said interdigitated electrode means by applying a voltage to said electrode means with said diffraction grating then operating on each input light signal to form a transmitted and diffracted wave in the output section in each of said pair of crossed waveguides;

coherently combining the transmitted and diffracted waves formed in the output section of each of said pair of crossed waveguides by applying voltages that are equal in magnitude but opposite in sign to each of said upstream and downstream phase shifter means associated with said crossed waveguides and adjusting said voltages so that the transmitted and diffracted waves formed in the output section in one waveguide are combined in phase and the transmitted and diffracted waves formed in the output section of the other waveguide are combined 180° out of phase;

sweeping the voltage applied to said interdigitated electrode means until the amplitude of the coherently combined transmitted and diffracted waves formed in the output section of one waveguide is zero; and repeating the above steps for each column of the matrix.

* * * * *

UNITED STATES PATENT AND TRADEMARK OFFICE
CERTIFICATE OF CORRECTION

PATENT NO. : 4,950,042

DATED : August 21, 1990

INVENTOR(S) : Gaylord, et al

It is certified that error appears in the above-identified patent and that said Letters Patent is hereby corrected as shown below:

On the title page, item [19] line 2, the inventors should be listed as --Gaylord et al. --; and On the title page, line 5, the inventors name should be spelled --Gaylord--.

Signed and Sealed this

Third Day of December, 1991

Attest:

HARRY F. MANBECK, JR.

*Attesting Officer*   *Commissioner of Patents and Trademarks*